(12) United States Patent
Kollitz

(10) Patent No.: US 11,440,370 B2
(45) Date of Patent: Sep. 13, 2022

(54) CROSS-LINKED VEHICLE SUSPENSION

(71) Applicant: Kolltek, LLC, Roseburg, OR (US)

(72) Inventor: Alex Kollitz, Roseburg, OR (US)

(73) Assignee: Kolltek, LLC, Roseburg, OR (US)

( * ) Notice: Subject to any disclaimer, the term of this patent is extended or adjusted under 35 U.S.C. 154(b) by 151 days.

(21) Appl. No.: 16/425,038

(22) Filed: May 29, 2019

(65) Prior Publication Data

US 2020/0376916 A1     Dec. 3, 2020

(51) Int. Cl.
*B60G 21/045*     (2006.01)

(52) U.S. Cl.
CPC .... *B60G 21/045* (2013.01); *B60G 2204/8302* (2013.01); *B60G 2204/8306* (2013.01)

(58) Field of Classification Search
CPC .... B60G 21/04; B60G 21/045; B60G 21/023; B60G 21/026; B60G 2204/8102; B60G 2204/8306; B60G 2204/8302
See application file for complete search history.

(56) References Cited

U.S. PATENT DOCUMENTS

| | | | | |
|---|---|---|---|---|
| 2,166,368 A | * | 7/1939 | Perron | B60G 3/12 280/124.128 |
| 2,416,388 A | * | 2/1947 | Hendrix | B60G 11/50 267/185 |
| 2,941,815 A | * | 6/1960 | Muller | B60G 17/0277 280/124.107 |
| 3,147,990 A | * | 9/1964 | Wettstein | B60G 11/64 280/104 |
| 3,599,954 A | * | 8/1971 | Yew | F16F 13/002 267/44 |
| 3,633,935 A | * | 1/1972 | Boyer | B60G 17/01933 280/6.158 |
| 3,727,961 A | * | 4/1973 | Shakespear | B60G 15/12 293/134 |
| 3,782,755 A | * | 1/1974 | Spichala | B60G 17/033 280/6.157 |
| 3,829,120 A | * | 8/1974 | Redding, Jr. | B60G 11/20 280/6.16 |
| 5,447,332 A | * | 9/1995 | Heyring | B60G 17/056 280/124.104 |

(Continued)

FOREIGN PATENT DOCUMENTS

FR     392438     * 11/1908     ............. B60G 21/04

OTHER PUBLICATIONS https://balzerinc.com/Media/Default/Products/Documents/2014%20Vacuum%20Tank%20Brochure.pdf, accessed on Nov. 5, 2020.

(Continued)

*Primary Examiner* — Frank B Vanaman
(74) *Attorney, Agent, or Firm* — Renaissance IP Law Group; David A. Crowther

(57) ABSTRACT

Cross-linked vehicle suspension systems. A first wheel is mechanically linked to a second wheel by a cross tie, so that motion from an impact with an obstacle by the first wheel is transmitted to the second wheel. A shock absorber may be coupled to each wheel, the cross tie, or both, to distribute absorption of the impact. In some embodiments, a second pair of wheels may be coupled by a second cross tie and configured diagonally to the first pair of wheels. A shock absorber may be coupled to both cross ties to link all wheels together, for full distribution of all loads across all wheels.

15 Claims, 10 Drawing Sheets

(56) References Cited

U.S. PATENT DOCUMENTS

| | | | | |
|---|---|---|---|---|
| 5,772,224 | A * | 6/1998 | Tong | B60G 17/01908 280/5.509 |
| 6,499,754 | B1 * | 12/2002 | Heyring | B60G 21/045 280/124.106 |
| 6,942,230 | B1 * | 9/2005 | Fontdecaba Buj | B60G 11/16 280/124.104 |

OTHER PUBLICATIONS https://en.wikipedia.org/wiki/Audi_RS_6, accessed on Nov. 5, 2020.
https://en.wikipedia.org/wiki/Kinetic_Dynamic_Suspension_System, accessed on Nov. 5, 2020.
https://www.audi-mediacenter.com/en/technology-lexicon-7180/chassis-7185, accessed on Nov. 5, 2020.
https://www.edmunds.com/car-reviews/track-tests/2011-infiniti-qx56-suspension-walkaround.html, accessed on Nov. 5, 2020.
https://www.whiterivertoyota.com/blog/how-does-the-toyota-kinetic-dynamic-suspension-system-work/, accessed on Nov. 5, 2020.
Translation of French application: FR 392.438 to Ocejo y Ocejo, (filed) ; Nov. 26, 1908 (pub'd.), Brevet D'Invention, Office National De La Propriete Industrielle, Jul. 9, 1908.

\* cited by examiner 5 shock 6 shock 3 shock 4 shock

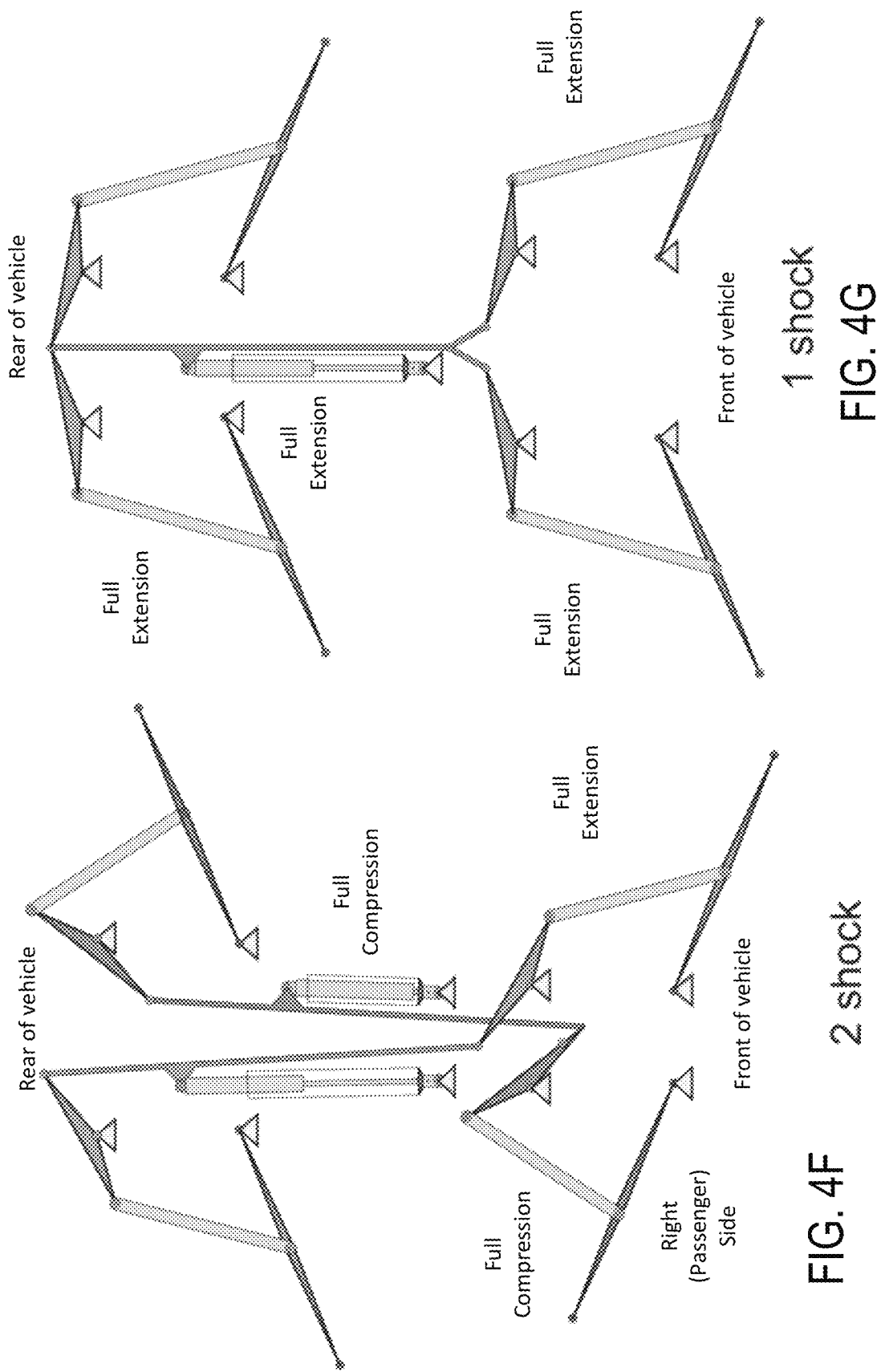

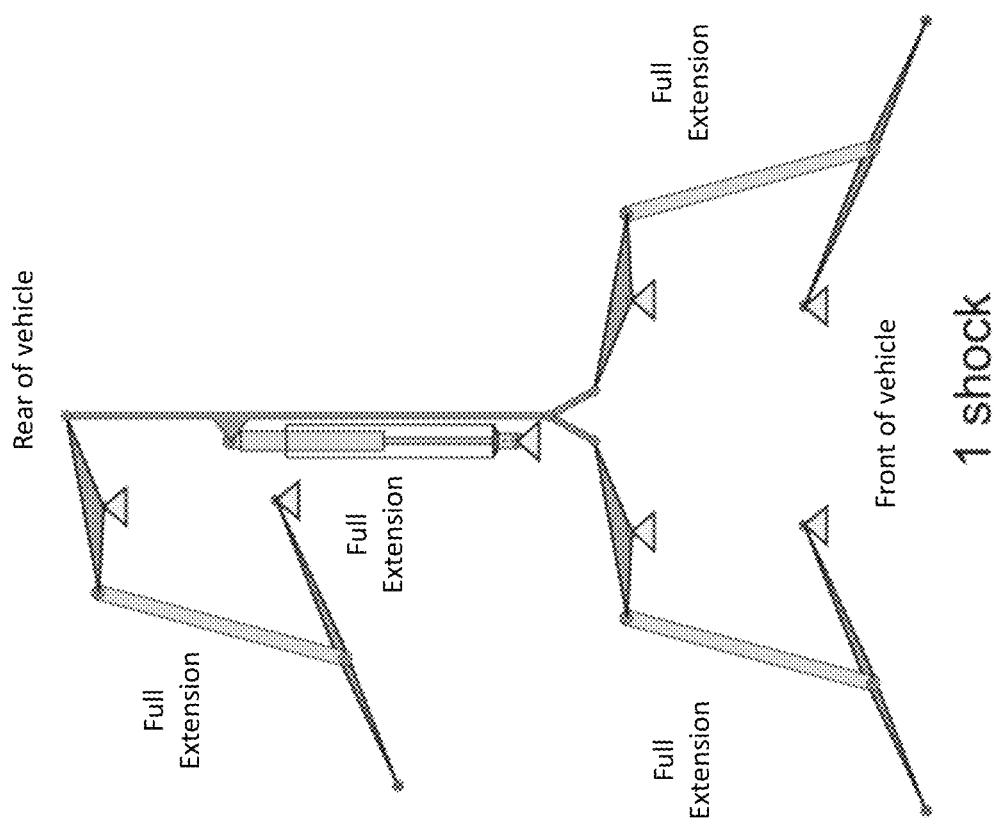
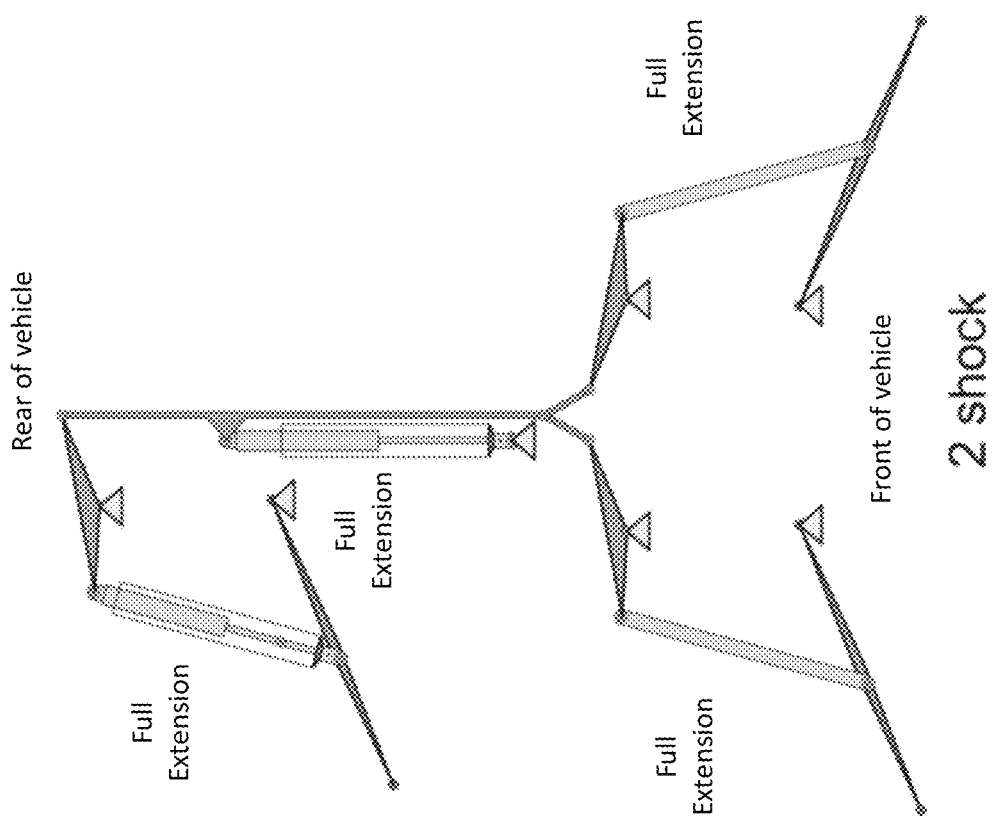

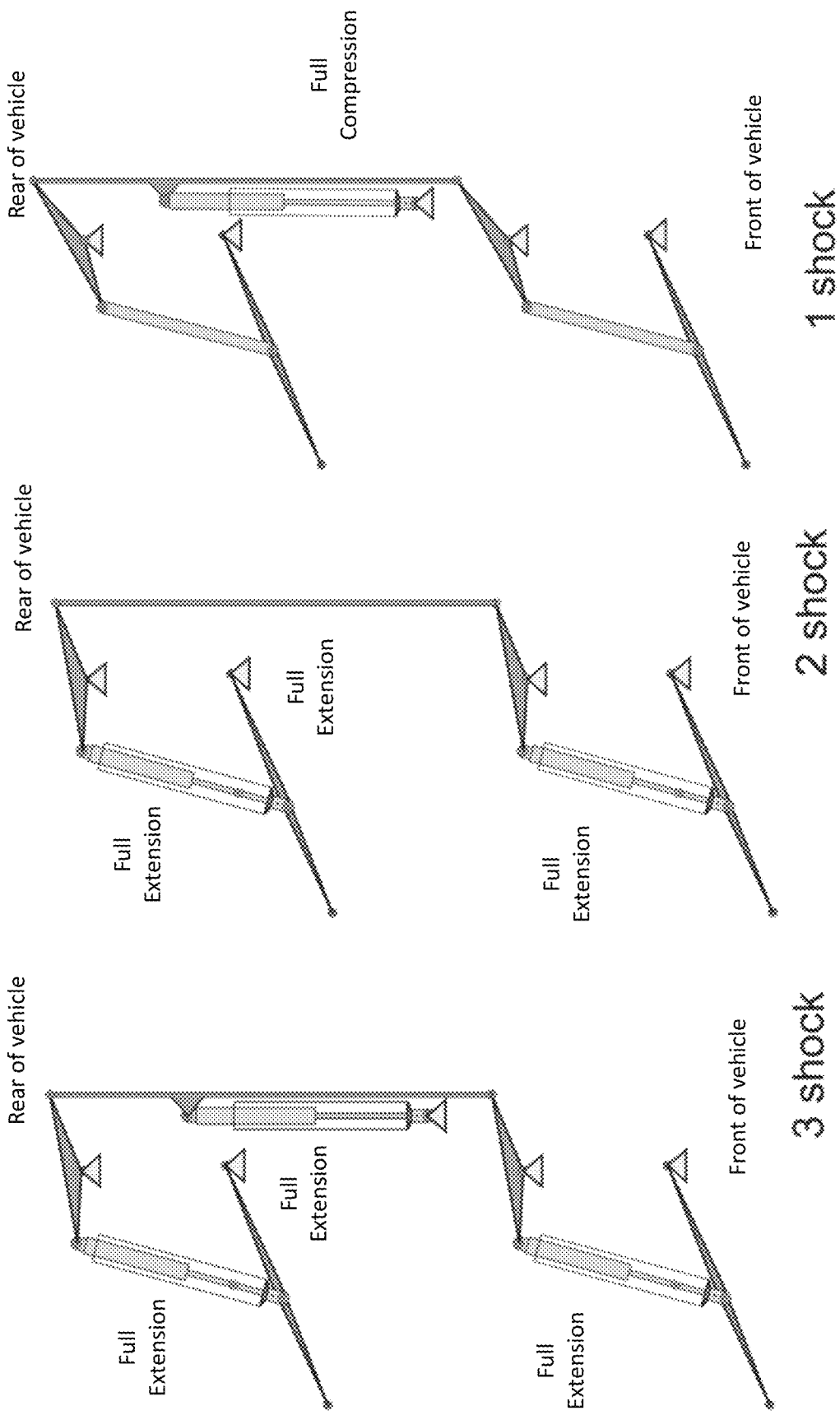

CROSS-LINKED VEHICLE SUSPENSION

TECHNICAL FIELD

Disclosed embodiments are directed to a vehicle suspension system. In particular, embodiments include a suspension system that cross-links two axles together to distribute loads imposed by bumps and other obstacles.

BACKGROUND

Vehicle suspension systems are typically designed to help absorb and dissipate shocks encountered during a vehicle's travel, such as impacts experienced from running over surface defects or obstacles like potholes, rocks, bumps, ruts, etc. This is usually accomplished by configuring the axles of the vehicle to pivot or articulate, and then suspending each axle with some form of a damping mechanism, such as a spring or shock absorber. Each axle is often suspended from around the wheel hub using an articulating arm that is connected at one end to the wheel hub, and at the other end to the vehicle frame. The damping mechanism is then connected between the articulating arm and the vehicle frame. When the wheel rides over an obstacle, the impact causes the axle and arm to pivot, transferring the vertical motion from the impact to the damping mechanism.

The damping mechanism is often some combination of spring coupled with a shock absorber. The spring (or a similar type of mechanism) is typically configured to provide a counter resistance against the impacts, to aid in keeping each wheel in contact with the ground and helping to ensure proper vehicle control. The spring also absorbs much of the energy of the initial impact to prevent it from being directly transmitted to the vehicle frame, thus blunting the felt impact of the shock. The shock absorber provides further resistance to dissipate the energy imparted to the vehicle by the impact, but unlike the spring, does not store the energy. Because the spring stores energy, without the shock absorber, the spring may oscillate upon impact with an obstacle, which can diminish vehicle control. The shock absorber thus acts to dissipate the spring's stored energy.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4F is a diagram of an example alternate embodiment of a 2 shock cross-linked vehicle suspension system.

FIG. 4G is a diagram of an example alternate embodiment of a 1 shock cross-linked vehicle suspension system.

FIG. 4J is a diagram of an example alternate embodiment of a 2 shock cross-linked vehicle suspension system.

FIG. 4K is a diagram of an example alternate embodiment of a 1 shock cross-linked vehicle suspension system.

FIG. 4L is a diagram of an example alternate embodiment of a 3 shock cross-linked vehicle suspension system.

FIG. 4M is a diagram of an example alternate embodiment of a 2 shock cross-linked vehicle suspension system.

FIG. 4N is a diagram of an example alternate embodiment of a 1 shock cross-linked vehicle suspension system.

DETAILED DESCRIPTION

Figure 1:
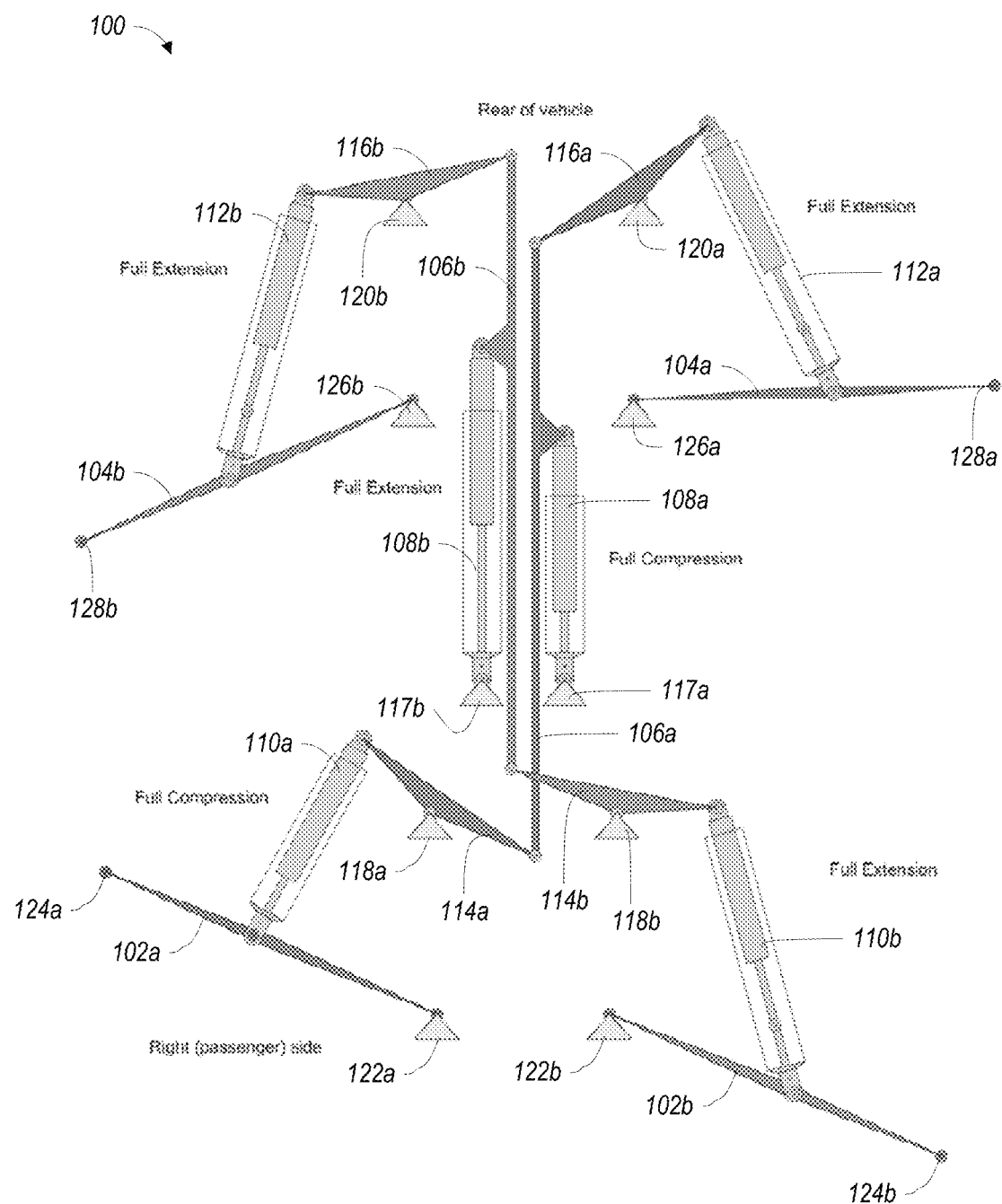
FIG. 1 illustrates an example cross-linked vehicle suspension system for a four-wheel vehicle, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Existing vehicle suspension systems are typically configured so that each wheel is independently suspended, where an impact or jolt imparted to a given wheel is not directly transmitted to the remaining vehicle wheels. Thus, the energy and motion from an impact experienced by a single wheel is immediately transmitted only to that wheel's suspension components, viz. by the shock and/or spring combination that is coupled to the wheel. As the shock and spring components absorb the bulk of the energy from the impact, only an attenuated portion is transmitted to the vehicle body. The remaining wheels, in turn, only incidentally contribute to absorbing the impact, as they absorb the shock only insofar as the vehicle body is displaced, and weight is shifted to the remaining wheels.

This configuration presents several problems. First, the suspension components of each wheel have a finite travel distance. If an obstacle is struck with sufficient force to use the entire travel distance of a wheel's suspension, the remainder of the impact is directly transmitted to the vehicle frame without further attenuation. This can result in damage to vehicle frame components, to say nothing of the harsh jolt transmitted to the vehicle passengers. If the impact is felt on a steered wheel, the impact can damage steering linkages and/or render the vehicle difficult or impossible to control. Second, in reaction to the impact, the vehicle is typically displaced away from the impact. Depending upon the terrain and vehicle conditions at the time of impact, the vehicle may be thrown out of control or induced to roll over. For example, if the vehicle is traversing a slope or is otherwise already at an angle, an impact (depending upon the circumstances, the impact need not exceed the suspension travel) may displace the vehicle past its center of gravity and cause a roll over. Third, a traditional configuration results in the vehicle either rearing up, e.g. loading and depressing the vehicle frame towards the rear wheels while unloading the front wheels, upon hard acceleration, or ducking down, e.g. loading and depressing the vehicle frame towards the front wheels while unloading the rear wheels, upon hard braking/deceleration. This behavior can cause reduce traction from the unloaded wheels. Thus, on hard acceleration, steering control may be compromised, while on hard braking, the rear end may be more prone to breaking loose and causing fishtailing.

Disclosed embodiments address these issues by providing a suspension configuration that cross-links the wheels, so that an impact experienced on one wheel is more evenly transmitted to across all wheels. Embodiments provide a suspension system that offers an improved suspension travel, increased impact absorbing ability, as well as greater resistance to vehicle body roll. Moreover, the cross-linked configuration helps reduce rearing and ducking, such as induced by acceleration or braking, respectively. Thus, the disclosed cross-linked suspension systems can enhance both impact absorption ability, as well as vehicle controllability.

As used herein, "spring rate" refers to the amount of weight that is needed to compress a spring a given distance. If the rate of the spring is linear, its rate is not affected by the load that is put on the spring. For example, a spring with a rate of 200 lbs. per inch will compress 1" when a 200 lbs. load is placed onto the spring. If another 200 lbs. is put onto the spring, the spring will compress another inch. At this point the load on the spring is 400 lbs. The rate of the spring, however, remains constant at 200 lbs. per inch. Some springs may have a variable or progressive rate, where the rate starts low and ramps up in relation to the weight placed upon the spring. For example, a spring with a progressive rate may start at 200 lbs./inch, then after compressing 1" from a 200 lbs. load, will ramp to a 300 lbs./inch rate. An additional 200 lbs. would thus compress the spring an amount less than 1", as 500 lbs. total weight (initial 200 lbs. plus 300 lbs. for the increased rate) would be needed to compress the spring the full additional 1", for a total travel of 2".

As used herein, "mechanically linked" components include arrangements where motion or force imparted upon one of the components is transmitted, in whole or in part, to the other component. The components need not be directly connected, but may be connected by way of intervening components that serve to transfer the motion or force, or a portion of the motion or force, between the mechanically linked components. The intervening components may modify, attenuate, amplify, or otherwise affect the motion or force being transmitted, or may transmit the motion or force substantially as received without alteration.

FIG. 1 illustrates an example vehicle suspension system 100. In the depicted embodiment, suspension system 100 includes a first assembly that includes a first articulated arm 102a and a second articulated arm 104a. The first and second articulated arms 102a and 104a are mechanically linked together by a first cross tie 106a. A first shock absorber 108a is mechanically linked to the assemblage of first articulated arm 102a, second articulated arm 104a, and cross tie 106a. As depicted in FIG. 1, first shock absorber 108a is coupled to cross tie 106a so as to receive motion from cross tie 106a and, due to cross tie 106a being mechanically linked to first and second articulated arms 102a and 104a, motion from first and/or second articulated arms 102a and 104a. As can be seen in FIG. 1, a second assembly, identical in configuration but a mirror image of the first assembly, includes a third articulated arm 102b, fourth articulated arm 104b, a second cross tie 106b mechanically coupled to the third and fourth articulated arms 102b and 104b, and a second shock absorber 108b mechanically linked to the assemblage of the third and fourth articulated arms 102b and 104b, and the second cross tie 106b. For ease of reference, components in the embodiment depicted in FIG. 1 are referred to with an "a" or "b" designation appended to the call-out to denote mechanical interconnectedness, viz. all components with an "a" are mechanically linked to each other, but may be separate from (not mechanically linked to) components with a "b", while all components with a "b" are mechanically linked together. It should be understood that different embodiments may have different combinations of components linked together, where some combination of both "a" and "b" components may be linked. Where a part is referred to without the "a" or "b", e.g. first articulated arm 102, such a designation refers to either arm 102a or (third) arm 102b.

The example depicted in FIG. 1, as may be seen, is configured for a four-wheeled vehicle, such as an automobile, truck, sport-utility vehicle (SUV), off-road vehicle (ORV), quad all-terrain vehicle (ATV), or any other similar vehicle that uses four points of contact with the surface. The vehicle may be wheeled, or may be equipped with other types of traction devices, such as skis. As will be explained in greater detail herein, the first and second assembly in the embodiment of FIG. 1 cross-connect diagonally, and so form essentially form an "X" configuration. Thus, if first articulated arm 102a is associated with a vehicle's right (passenger) front wheel, second articulated arm 104a is associated with the vehicle's left (driver) rear wheel; in corresponding fashion, the third articulated arm 102b is associated with the vehicle's left front wheel, and the fourth articulated arm 104b is associated with the vehicle's right rear wheel. Other configurations are possible, as will be discussed herein with respect to FIGS. 4A-4N.

In embodiments, each articulated arm 102 and 104 is comprised of one or more components designed to withstand the forces that may be experienced in expected use for a vehicle to which the arm is equipped. Arms equipped to passenger vehicles intended for road use that experience relatively few obstacle impacts may be constructed less robustly than arms equipped to off-road vehicles intended for use in severe off-road conditions, over rough terrain that presents many impacts of varying intensity. A less robust arm may be lighter weight, offering fuel savings for a passenger vehicle, while a more robust arm may be heavier, to absorb a greater number of high intensity impacts without sustaining damage or undue wear. Each articulated arm 102, 104 (and its constituent components, where the arm is comprised of multiple components) may be constructed of metal, plastic, composites, or any other material or combination of materials suitable for the arm's intended use.

Each articulated arm, as may be seen in the example of FIG. 1, is attached at a first end to the vehicle frame, chassis, or another suitable vehicle structure at a mount point 122a (for first articulated arm 102a), 126a (for second articulated arm 104a), 122b (for third articulated arm 102b), and 126b (for fourth articulated arm 104b), and at a second end to a corresponding wheel at end 124a (for first articulated arm 102a), 128a (for second articulated arm 104a), 124b (for third articulated arm 102b), and 128b (for fourth articulated arm 104b). As suggested by the name "articulated arm", each mount point 122 and 126, and/or ends 124 and 128 are articulated or otherwise pivoting, to allow the articulated arms 102 and 104 to rotate relative to the vehicle frame and/or wheel in response to an impact with an obstacle.

Each articulated arm 102 and 104, in the example embodiment of FIG. 1, is mechanically linked to the cross tie 106 via a shock absorber 110 and 112, respectively. One end of shock absorber 110 and 112 is coupled to articulated arm 102 and 104, respectively, with the opposing distal end of shock absorber 110 and 112 coupled to a linking arm 114 and 116, respectively. Shock absorber 110 and 112 may each couple to articulated arm 102 and 104 at any suitable location along the length of the articulated arm. As each articulated arm 102, 104, essentially acts as a lever with a fulcrum point of the mount point 122 and 126, the location where the shock absorber attaches to the articulated arm can impact how loads imparted by obstacle impacts are transferred to the shock absorber, and, by extension, the remaining components of the assemblage.

For a given shock absorber 110, 112, the further away from mount point 122, 126 the shock absorber is attached to articulated arm 102, 104, the greater the amount of damping effect the shock absorber will impart. However, such mounting also requires a greater amount of travel from the shock absorber, as the distance traveled by articulated arm 102, 104, in an impact increases further away from mount point 122, 126, as will be understood. Conversely, mounting a shock absorber closer to mount point 122, 126 will result in a lesser damping effect, but also allow use of a shock absorber with a relatively shorter range of travel. To consider from another point of view, shock absorbers mounted further from mount point 122, 126 may need to be configured to offer less resistance but greater travel, while shock absorbers mounted closer to mount point 122, 126 may need to be configured to offer a greater resistance, but shorter travel. In some embodiments, the placement of the coupling of each shock absorber 110, 112 may vary across one or more articulated arms 102, 104 to achieve a desired overall vehicle suspension behavior.

Each linking arm 114, 116 has a first end coupled to shock absorber 110, 112, respectively, and a second end coupled to one end of cross tie 106. In turn, each linking arm 114, 116 is attached to a vehicle frame or other relatively stationary mount point at a mount point 118, 120, respectively. The location at which each linking arm 114, 116 mounts to mount point 118, 120 relative to shock absorber 110, 112 and cross tie 106 determines, in embodiments, how the linking arm 114, 116 translates motion imparted through either the shock absorber 110, 112 and/or cross tie 106. For example, changing the location along linking arm 114, 116 where the linking arm attaches to mount point 118, 120, acting as a fulcrum, changes the degree to which linking arm 114, 116, acting as a lever, translates motion for force. Further, mounting the shock absorber 110 and/or 112 on the same side of linking arm 114 and/or 116 as cross tie 106 will result in cross tie 106 and shock absorber 110 and/or 112 moving in the same direction, rather than reversing direction, as would result from the configuration of FIG. 1.

As can be seen in FIG. 1, linking arms 114, 116 serve to translate the direction of movement imparted to shock absorber 110, 112 by articulated arm 102, 104, to the correct direction to distribute the load of an impact through cross tie 106. In the case of FIG. 1, linking arms 114, 116 cause an impact that raises either of articulated arms 102, 104 to transfer through cross tie 106 and raise the corresponding articulated arm 104, 102, respectively. Each linking arm 114, 116 may be constructed from materials similar to those used for articulated arms 102, 104, as suitable for a given embodiment of vehicle suspension system 100. In some embodiments, one or either of articulated arms 102, 104 may be omitted as unnecessary. In other embodiments, one or either of articulated arms 102, 104 may comprise additional components. Further, various embodiments may employ different configurations of linking arms 114, 116; in some embodiments, the configuration of a linking arm 114 may vary from linking arm 116, as discussed above, in a single embodiment, depending upon the needs of a given implementation.

Cross tie 106, in embodiments, links the suspension components of one wheel with a second wheel. As depicted in FIG. 1, cross tie 106 links articulated arm 102, shock absorber 110, and linking arm 114 to linking arm 116, shock absorber 112, and articulated arm 104. In some embodiments, a shock absorber 108 may further be coupled between cross tie 106 and a vehicle frame or chassis mounting point 117. Cross tie 106 thus acts to transfer the shock of an impact on one wheel to its other linked wheel and associated suspension, as well as a central or common shock absorber 108. This linking enables the shock and corresponding impact from an obstacle to be distributed across the entire vehicle frame, rather than an incidental distribution through vehicle body roll. Referring to FIG. 1, an impact upon the front passenger wheel will be transmitted, via levering of articulated arm 102a, through cross tie 106a to second articulated arm 104a, which will result in, at least, an unloading of shock absorber 112a and potentially some degree to unloading and/or pulling up of a wheel attached to second articulated arm 104a. Thus unloading, in turn, due to the weight of the vehicle will transfer a greater load to the front driver's side and rear passenger's side wheels (corresponding to third and fourth articulated arms 102b and 104b. As a result, a vehicle configured with suspension system 100 encountering an obstacle to the front passenger wheel will have less a tendency to be lifted away from the front passenger wheel (with a commensurate high loading of the rear driver wheel, diagonal from the obstacle), but instead be configured to maintain a more even stance with a greater load transferred to the front driver and rear passenger wheels.

Cross tie 106 may be constructed in a similar fashion and from similar materials as the articulated arms and linking arms. The specific materials used will depend upon the needs of a given implementation. Moreover, cross tie 106, although depicted in the embodiment of FIG. 1 as a single piece, may be implemented as multiple pieces, in other embodiments. Further still, linking arms 114 and 116 may, in some embodiments, be considered as part of cross tie 106.

Shock absorbers 108, 110, and 112 each may be configured as damping mechanisms that absorb and store and/or dissipate energy imparted to the mechanism. In some embodiments, shock absorbers 108, 110, and/or 112 may include both a spring component, which resiliently absorbs the kinetic energy of an impact and stores it through either spring compression or tension, and a shock damper, which resists movement by dissipating it, typically by offering some sort of fluid resistance that converts the motion into heat. The spring may act to keep any attached structures at a desired position, with expansion or contraction storing energy into the spring which then biases the attached structures back to the spring's resting low-energy state. However, a spring typically dissipates kinetic energy only very slowly, instead oscillating as energy is gradually lost through internal and external friction. The shock damper slows the spring rate, and absorbs excess energy that may cause the spring to otherwise oscillate (e.g. "bounce") before reaching its resting state.

In some embodiments, the shock absorber 108, 110, and/or 112 may co-locate the spring and shock damper. In other embodiments, such as many vehicle suspensions, the spring and shock damper are separate units secured to the vehicle chassis at different points but that are mechanically linked to operate in tandem, such as via an articulating arm 102, 104, or other similar structure. In still other embodiments, a shock damper may integrate sufficient spring qualities (primarily, a tendency to return to an approximately central low-energy point) to forego a separate spring, with the shock damper offering both spring and damper characteristics in a single shock absorber unit. In embodiments, the spring portion of the shock absorber may have a variable rate, with the shock absorber's initial travel distance configured with an initial soft or low rate, which then increases to a harder or high rate as the shock absorber compresses. In some embodiments, the shock absorber may be adjustable, such as on the fly or via servicing. The shock damper may be implemented using hydraulic, pneumatic, mechanical, or any other suitable technology now known or later developed that is suitable for use in energy absorption. Likewise, the spring may be implemented using any technology suitable for vehicle springs, including both metallic springs, as well as other types of springs such as pneumatic air bags, pneumatic cylinders, air shocks, hydraulic pumps, cylinders, or any other suitable technology now known or later developed.

As may be appreciated, a vehicle configured with suspension system 100 will be resistant to ducking and rearing from braking and acceleration, as well as have reduced leaning while cornering, when compared with conventional suspension systems. For example, acceleration typically causes weight to shift to a vehicle's rear suspension, due to inertia. Suspension system 100 will transfer some of the weight and associated motion back to the front wheels, thus causing the vehicle to remain more level. Similarly, on a braking event, the weight shift to the front due to inertia will result in the rear suspension also being loaded; in a cornering maneuver, loading to the outside of the turn will be at least partially transferred to the inside wheels. In all cases, suspension system 100 provides an enhanced distribution of loads experienced unequally by one or more wheels to the remaining unloaded wheels, as compared to existing suspension systems.

Figure 2A:
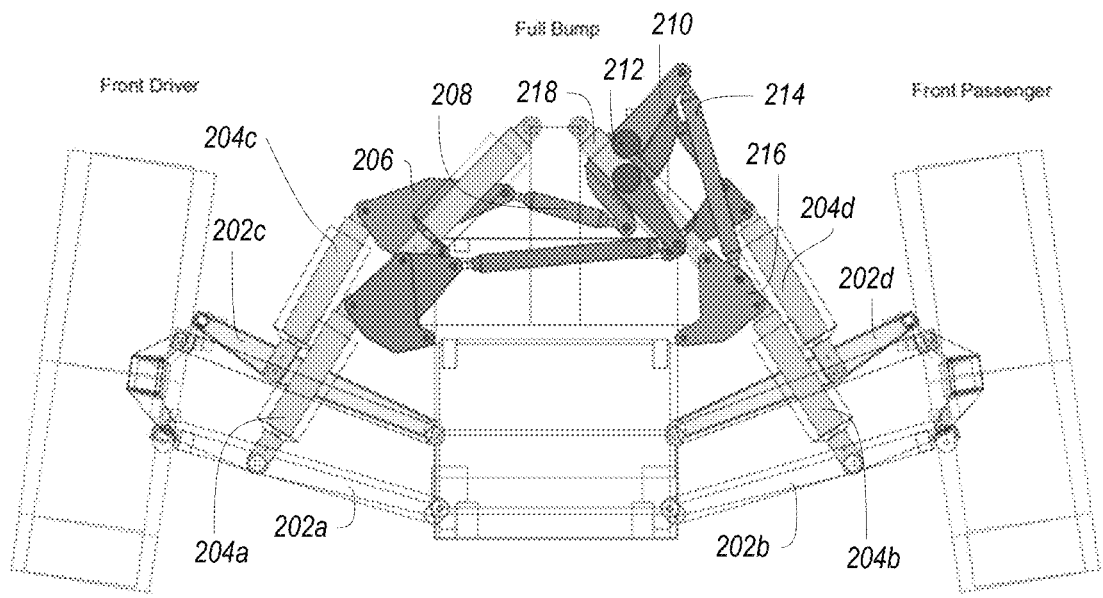
FIG. 2A illustrates a front elevation view of an example cross-linked vehicle suspension system on a four-wheel vehicle, according to various embodiments.
Figure 2B:
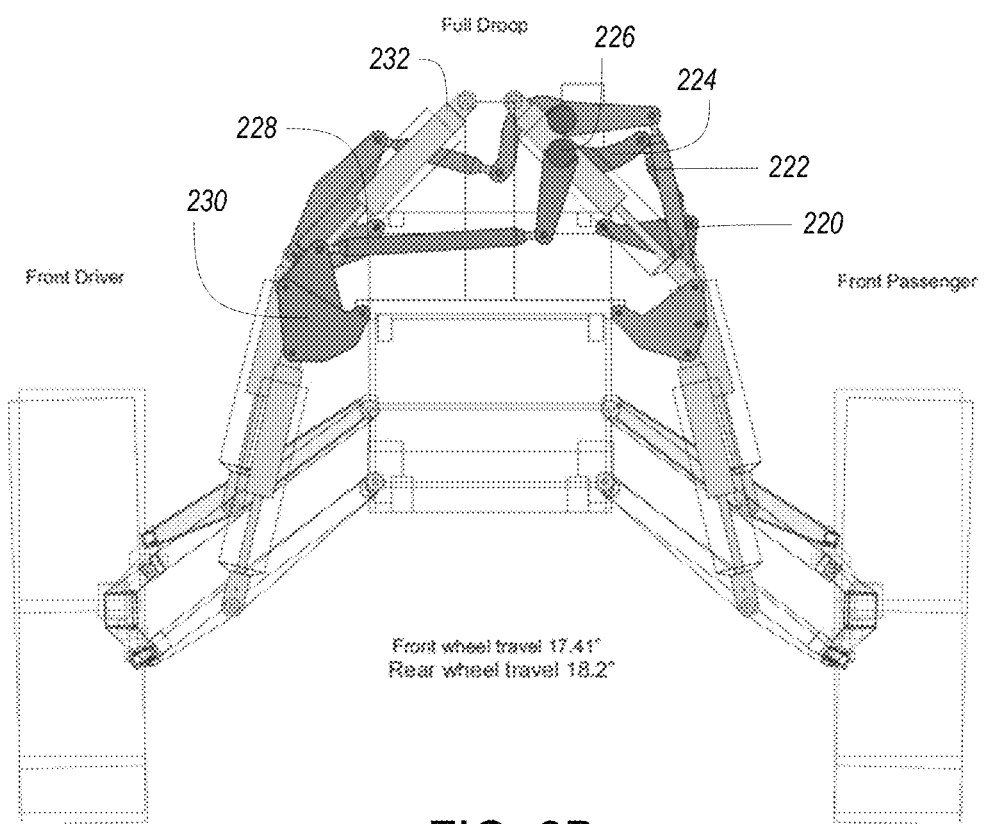
FIG. 2B illustrates a rear elevation view of the example cross-linked vehicle suspension system of FIG. 2A, according to various embodiments.

FIGS. 2A and 2B depict the components and component movement of an example vehicle with a suspension system similar to that of suspension system 100, from a front elevation perspective. FIG. 2A depicts the suspension in a "full bump" configuration, with the shock absorbers substantially compressed, as may be encountered immediately following impact with an obstacle such as a speed bump. FIG. 2B depicts the suspension in a "full droop" configuration, with the shock absorbers substantially extended, as may be encountered immediately following impact with an obstacle such as a rut or pothole. For ease of viewing, callouts are not duplicated between FIGS. 2A and 2B; instead, FIG. 2A includes callouts for each wheel and one cross tie between two wheels, and FIG. 2B includes callouts for the other cross tie between the remaining two wheels. The callouts would otherwise be identical for both FIGS. 2A and 2B. It should be understood that the connection of the wheels in FIGS. 2A and 2B are identical to those in FIG. 1, viz. the front driver's side wheel (corresponding to end 124b) is mechanically linked to the rear passenger's side wheel (corresponding to end 128b); likewise, the front passenger's side wheel (end 124a) is mechanically linked to the rear driver's side wheel (end 128a). Motion on any wheel of the vehicle is thus mechanically transmitted diagonally across the vehicle.

In FIG. 2A, a front elevation view is depicted of an embodiment of the suspension system described above with respect to example suspension system 100 in FIG. 1. Four wheels are each connected to an articulating arm 202a, 202b, 202c, and 202d. To each articulating arm is coupled one end of a shock absorber 204a, 204b, 204c, and 204d. The other end of each shock absorber 204a-d is attached to a component of a cross tie. The components of an example cross tie connecting two wheels include a first linking arm 206, adjustable first cross tie 208, second linking arm 210, adjustable second cross tie 214, and third linking arm 216. A shock absorber 218 is attached to linking arm 216. As will be understood by a person skilled in the art, an impact to the wheel attached to articulating arm 202c will at least partially compress shock absorber 204c, which in turn imparts a pushing motion to first linking arm 206. First linking arm 206 pivots away from shock absorber 204c, and in turn imparts the pushing motion on first cross tie 208 by virtue of its coupling to first linking arm 206. First cross tie 208 imparts the pushing motion to second linking arm 210, which pivots about attachment point 212 and so reverses the direction of motion imparted by first cross tie 208. Thus, second linking arm 210 imparts a pulling motion to second cross tie 214, which in turn imparts the pulling motion to third linking arm 216, which finally pulls upon shock absorber 204b, unloading it. In response to the unloading, articulating arm 202b is thus urged upward in a similar direction to articulating arm 202b. Further, as third linking arm 216 is pulled, it imparts motion to shock absorber 218, causing it to compress, thus absorbing some of the energy from the impact in conjunction with shock absorbers 204b and 204c.

It should be understood that components 206-216 are all mechanically linked, to that motion initially imparted to either articulating arm 202b or 202c will be transferred through components 206-216 to the other articulating arm 202c or 202b. Further, some components such as first cross tie 208 and second cross tie 214 may be configured to be adjustable, to allow tuning of the response of the suspension system.

FIG. 2B depicts the components linking the remaining two wheels, connected to articulating arms 202a and 202d, with their corresponding shock absorbers 204a and 204d. As with FIG. 2A, these components may include a first linking arm 230, an adjustable first cross tie 228, a second linking arm 224 which pivots about an attachment point 226 to reverse direction of motion, an adjustable second cross tie 222, and a third linking arm 220. A shock absorber 232 is attached between the vehicle chassis or frame and first linking arm 230. The components depicted in FIG. 2B operate substantially identically to the components depicted in FIG. 2A.

In some embodiments, second linking arms 210 and 224, which respectively pivot about attachment points 212 and 226, each comprise a tube or shaft as part of attachment points 212, 226, that extend from the front to the rear of the vehicle. In such configurations, the portion of linking arm 210 that connects to first cross tie 208 and the portion of linking arm 224 that connects to second cross tie 222 are located proximate to the rear of the vehicle in the embodiment of FIG. 2, and the portion of linking arm 210 that connects to second cross tie 214 and the portion of linking arm 224 that connects to first cross tie 228 are located proximate to the front of the vehicle. The two portions of each linking arm 210 and 224 are connected by the tube or shaft, which serves to transmit motion between the front and rear of the vehicle. Each attachment point 212, 226 may comprise multiple points on the vehicle to support the tube or shaft. Moving one of the portions of either linking arm 210 or 224 imparts a rotational motion to the tube or shaft, thus transmitting motion to the corresponding other portion of the linking arm 210 or 224. With such a configuration, the primarily lateral motion of suspension travel on one wheel is converted to a rotational motion, transmitted from one end of the vehicle to the other, then converted back to a primarily lateral motion that is conveyed to the other corresponding wheel.

Figure 3:
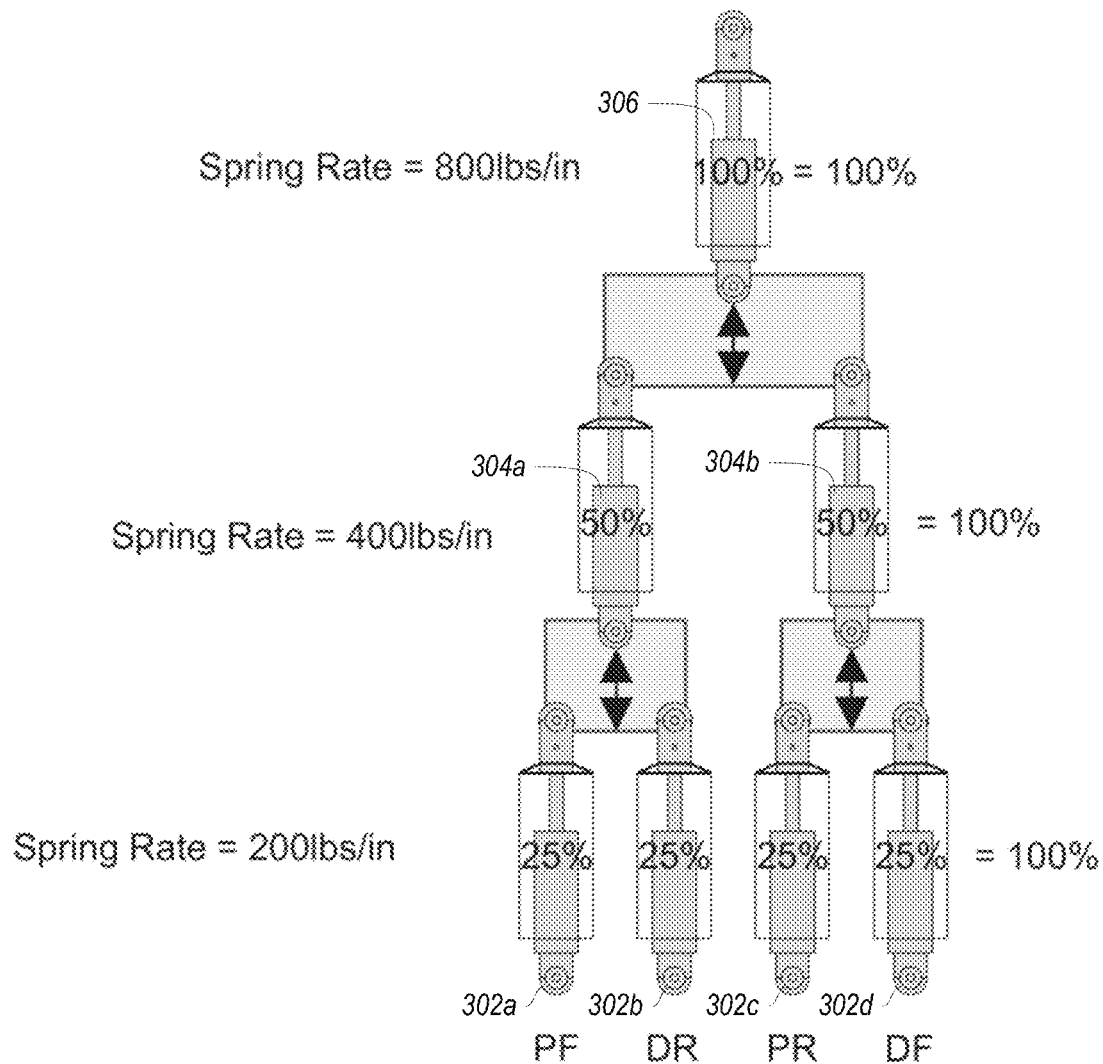
FIG. 3 is a diagram of the loading on various shocks that may be equipped to a cross-linked vehicle suspension system such as the example system of FIG. 1, according to various embodiments.

As may be appreciated from the foregoing, the cross linked suspension can cause the energy of an impact imparted to one wheel to be distributed to the other cross linked wheel, potentially allowing multiple shock absorbers to dissipate the energy. Such a configuration can allow each shock absorber attached to the suspension system to be fine-tuned or adjusted to achieve a desired suspension performance. FIG. 3 depicts an example diagram of how an obstacle impact may be distributed over multiple shock absorbers equipped to a cross-linked suspension system. Starting at the bottom of the diagram, four shock absorbers (or simply, "shock") 302a-d, labeled PF, DR, PR, and DF are depicted. These correspond to the four wheels of a vehicle, specifically, passenger front shock 302a, driver rear shock 302b, passenger rear shock 302c, and driver front shock 302d. As will be understood from FIG. 1, in a four wheel vehicle, the cross tie results in the passenger front shock 302a and driver rear shock 302b being linked, and the passenger rear shock 302c and driver front shock 302d being linked.

Each of the four shocks, on a vehicle that is well-balanced, receives 25% of the vehicle load. Due to the cross-linking, depicted as the box combining shocks 302a and 302b, and the box combining shocks 302c and 302d, the load of shocks 302a and 302b are transmitted to a shock 304a. Similarly, the load of shocks 302c and 302d are transmitted to a shock 304b. With reference to the example depicted in FIG. 1, shocks 304a and 304b would correspond to shock absorbers 108a and 108b, respectively, secured to the cross ties 106 and 106b. Each shock 304a and 304b respectively receives 50% of the vehicle load, with each shock 304a and 304b receiving its load from two diagonally opposed (taking FIG. 1 as the example) shocks. In some embodiments, such as will be described below, an additional shock 306 may be configured to tie shocks 304a and 304b together, essentially mechanically linking the two cross-linked suspension assemblages (in the case of FIG. 1). Shock 306 thus could receive 100% of the vehicle load. Because, as described above, the cross tie and associated arms transmit movement between wheels, linking the two cross ties via shock 306 effectively may result in at least some of the energy of an impact experienced at a single wheel being transmitted to all remaining wheels and, by implication, the other shocks 304a-b and 302a-d. Depending upon how the spring rate of each shock is configured and because all components in of the suspension are mechanically linked in the embodiment, an impact on any one or more of the wheels can result in a portion of the impact being absorbed, directly or indirectly, by every shock 302a-d, 304a-b, and 306, in the suspension system.

Because the vehicle load is accumulated via the suspension system to the various shocks at different points in the suspension system, shocks that receive a greater load can be configured with a greater weight, to provide a desired amount of shock absorber travel and level of firmness. As depicted in the embodiment of FIG. 3, the intermediate shocks 304a and 304b are configured with a rate that is twice (400 lbs/in.) those of the shocks 302a-d that are associated with each individual wheel (200 lbs/in.). Similarly, the top shock 306 that can potentially receive load from all wheels has a rate of 800 lbs/in., double those of the intermediate shocks 304a and 304b, and four times the rate of the wheel shocks 302a-d. This rate doubling reflects the multiplication of load passed up through the cross-linked suspension. Other embodiments may vary the rates across the tiers of shocks to achieve a desired suspension feel and behavior. In still other embodiments, one or more shocks may be configured with a variable or progressive rate, such as a shock absorber that starts with a low rate, but gets progressively higher as the shock absorber is compressed.

Figure 4A:
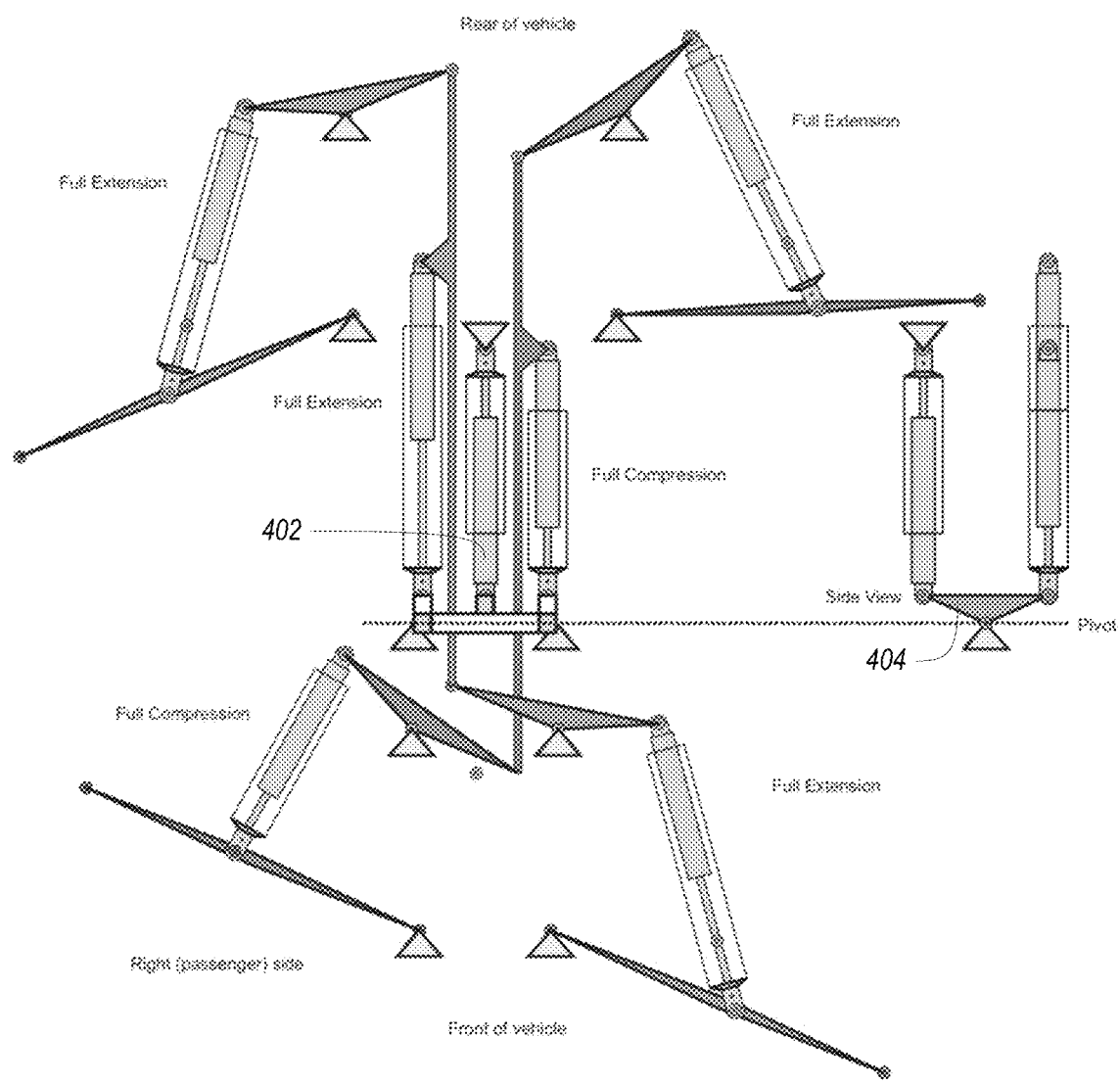
FIG. 4A is a diagram of an example alternate embodiment of a cross-linked vehicle suspension system.

Turning to FIGS. 4A-4N, various example embodiments of a cross-linked vehicle suspension system are depicted, with a variety of shock configurations as well as 4-, 3-, and 2-wheel implementations. Starting with FIG. 4A, a seven shock configuration, providing a layout for distributing the load across all four wheels, is depicted. The embodiment in FIG. 4A is substantially similar to the layout depicted in FIG. 1, with the addition of the seventh shock absorber 402, which is linked to the two shock absorbers that are coupled to the cross ties (corresponding to shock absorbers 108a and 108b). As seen in FIG. 4A, shock absorber 402 is coupled to the cross tie shock absorbers via a transfer arm 404, which itself is secured to the vehicle chassis in an articulated fashion. The cross tie shock absorbers, rather than being secured at one end to the vehicle chassis, are instead secured to the transfer arm 404, thereby allowing loads transferred from any of the one or more wheels to be at least partially absorbed by shock absorber 402.

Figure 4C:
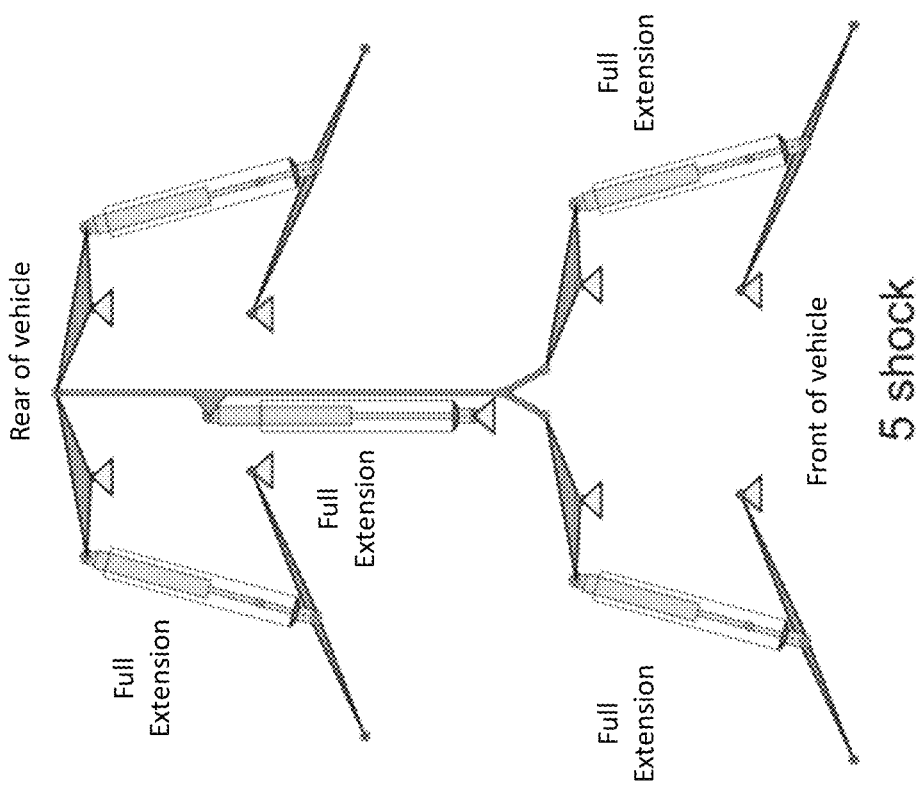
FIG. 4C is a diagram of an example alternate embodiment of a 5 shock cross-linked vehicle suspension system.
Figure 4B:
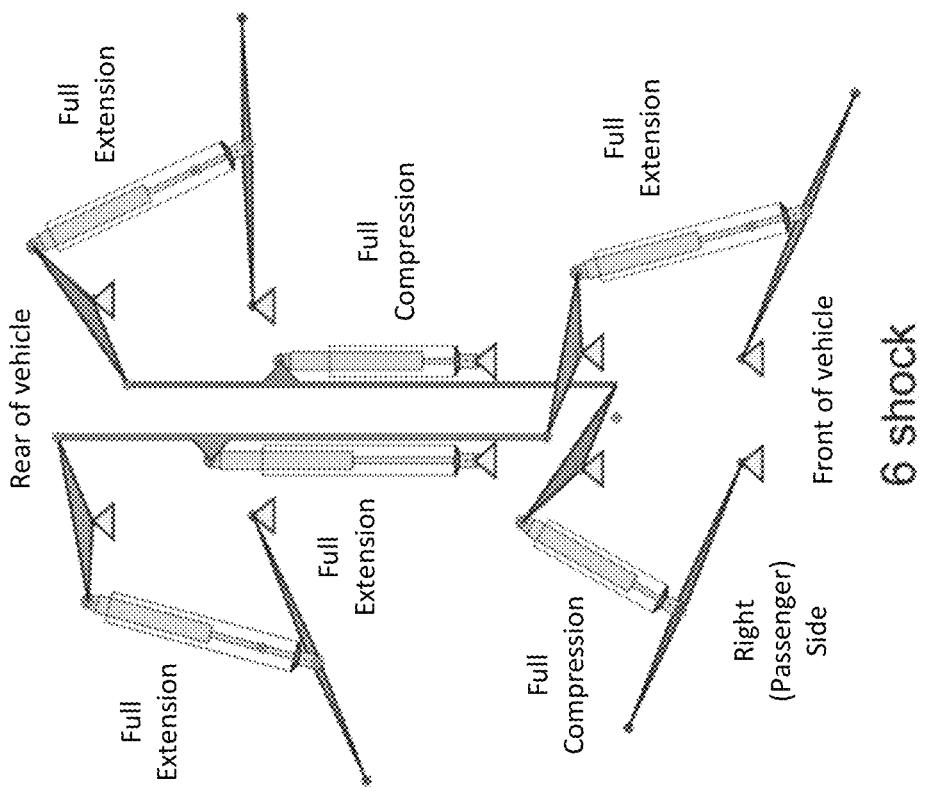
FIG. 4B is a diagram of an example alternate embodiment of a 6 shock cross-linked vehicle suspension system.

FIG. 4B is substantially identical to the layout depicted in FIG. 1. FIG. 4C modifies the layout of FIGS. 1 & 4B by tying all four wheels to a single central cross tie, rather than having two independent assemblages diagonally tying together two wheels. As will be understood, each of the four wheels, when moved such as from an obstacle impact, will cause the remaining three wheels to also be at least directly partially moved or loaded/unloaded, in addition to transferring load to the central shock absorber tied to the single cross tie. FIG. 4C can also be considered as a variant of one half of FIG. 1C, with an extra wheel and articulating arm added to each half.

Figure 4E:
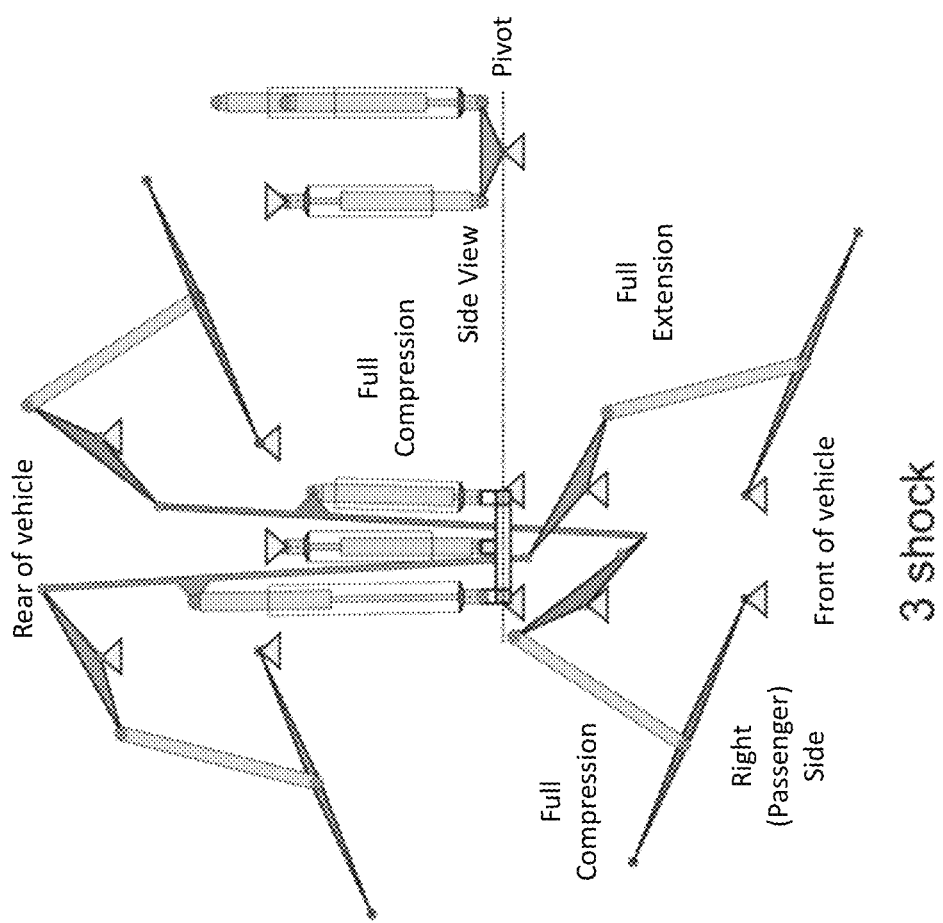
FIG. 4E is a diagram of an example alternate embodiment of a 3 shock cross-linked vehicle suspension system.
Figure 4D:
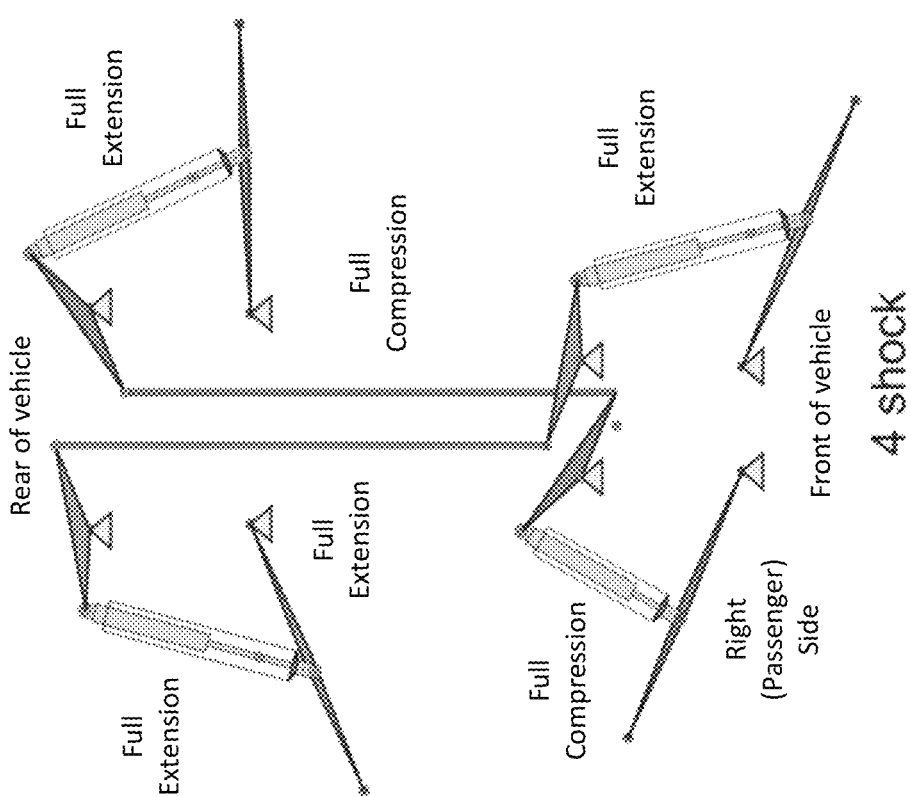
FIG. 4D is a diagram of an example alternate embodiment of a 4 shock cross-linked vehicle suspension system.

FIG. 4D is similar in layout to FIG. 1, with the exception that the central shock absorbers 108 tied to each cross tie have been omitted.

FIG. 4E is similar in layout to the seven shock arrangement of FIG. 4A, except that the individual shock absorbers for each wheel (corresponding to shock absorbers 110*a*, 110*b*, 112*a*, and 112*b* of FIG. 1) have been omitted. Thus, the energy from an impact on any of the wheels is absorbed by the wheel's associated cross tie, and at least partially absorbed by the central shock absorber tying together the two cross tie shock absorbers.

FIG. 4F is similar in layout to FIGS. 1 and 4E, with the exception that the shock absorbers for each wheel have been omitted, leaving only the two cross tie shock absorbers, with each absorbing the load from its associated two wheels.

FIG. 4G is similar in layout to FIG. 4C, with the exception that the shock absorbers for each wheel have been omitted. All impacts from any wheel are absorbed solely by the single shock coupled to the cross tie.

Figure 4I:
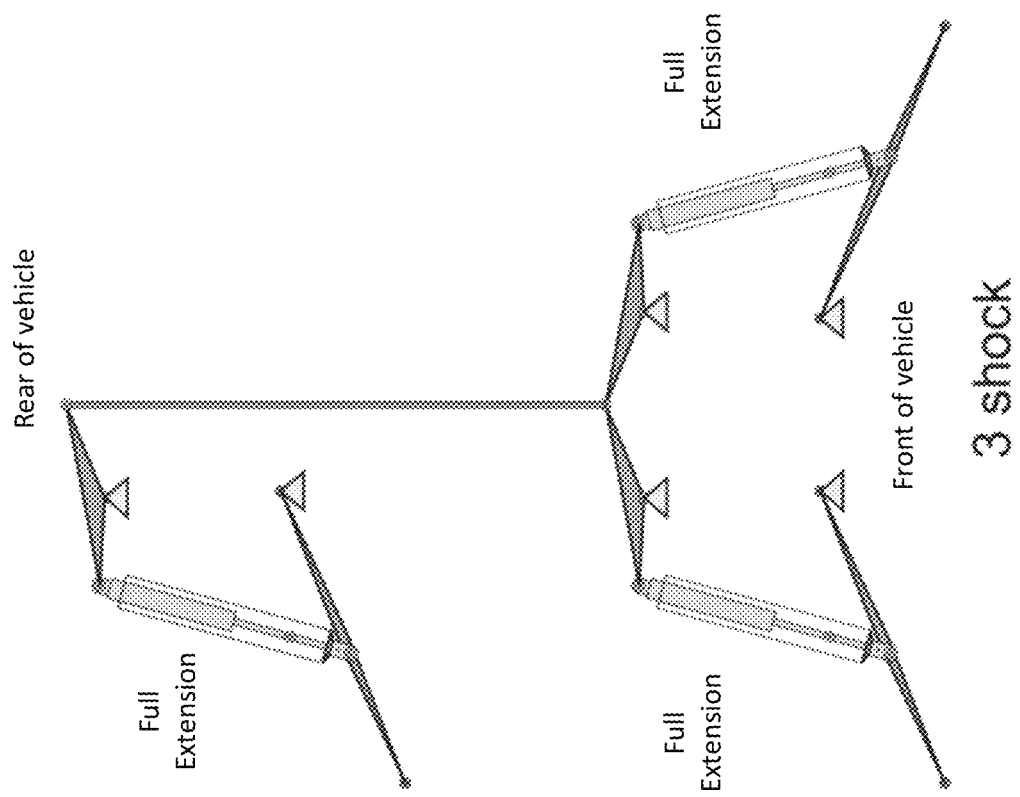
FIG. 4I is a diagram of an example alternate embodiment of a 3 shock cross-linked vehicle suspension system.
Figure 4H:
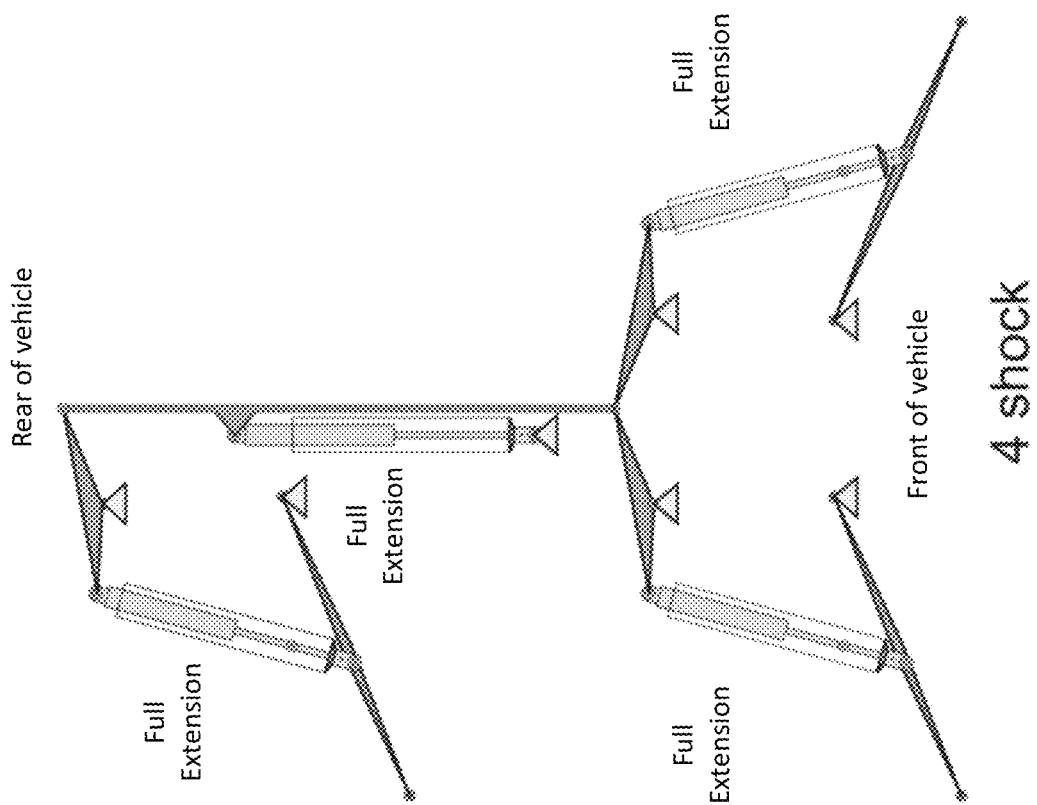
FIG. 4H is a diagram of an example alternate embodiment of a 4 shock cross-linked vehicle suspension system.

FIGS. 4H-4K depict three-wheeled configurations of a cross-linked suspension system. In each implementation, a single cross tie connects each of the three wheels, similar to the layouts of FIGS. 4C and 4G, albeit with one less wheel. FIG. 4H includes shocks on each wheel, as well as a shock absorber coupled to the cross tie. FIG. 4H can also be considered a variation of one half of the layout of FIG. 1, with an additional wheel and associated articulated arm and linking arm added. FIG. 4I is similar to the layout of FIG. 4H, except that the shock absorber coupled to the cross tie is omitted.

FIGS. 4J and 4K omit all shocks from the wheels in favor of one shock coupled to the cross tie. In the case of FIG. 4J, one wheel is also equipped with a shock.

FIGS. 4L, 4M, and 4N depict two-wheel configurations of a cross-linked suspension system. Each can be thought of one half of the layout of FIG. 1, and includes many of the same components. FIG. 4L is substantially identical to one half of FIG. 1. FIG. 4M omits the shock absorber coupled to the cross tie. FIG. 4N omits the shock absorbers on each wheel, and only has the shock absorber coupled to the cross tie.

Other embodiments and variations of cross-linked suspension systems may be possible, with varying numbers of wheels and/or shock absorbers, still keeping within the scope of this disclosure. As will be appreciated by a person skilled in the relevant art, the choice of a given embodiment may depend upon a variety of factors pertinent to the intended use of the embodiment.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A vehicle suspension system, comprising:
    a first articulated arm pivotably coupled to a frame of a vehicle;
    a second articulated arm pivotably coupled to the vehicle frame;
    a cross tie with a first end mechanically linked to the first articulated arm and a second end, distal from the first end, mechanically linked to the second articulated arm; and
    a shock absorber mechanically linked to the first articulated arm, the second articulated arm, and the cross tie;
    wherein the cross tie is mechanically linked to the first and second articulated arms such that a movement of either the first or second articulated arm is at least partially transmitted to the shock absorber and at least partially transmitted to the other articulated arm;
    wherein the shock absorber is a first shock absorber, and the first shock absorber mechanically links the first articulated arm to the first end;
    further comprising a second shock absorber that mechanically links the second articulated arm to the second end; and
    further comprising a third shock absorber coupled to the cross tie.

2. The vehicle suspension system of claim 1, wherein the first shock absorber is coupled to the cross tie.

3. The vehicle suspension system of claim 1, wherein each articulated arm is coupled to a wheel assembly.

4. The vehicle suspension system of claim 1, wherein each articulated arm is mechanically linked to the cross tie through a linking arm.

5. The vehicle suspension system of claim 1, further comprising a third articulated arm pivotably coupled to the vehicle frame and mechanically linked to either the first or second end of the cross tie.

6. The vehicle suspension system of claim 1, wherein the first shock absorber comprises a spring.

7. The vehicle suspension system of claim 1, wherein the first shock absorber comprises a damping mechanism.

8. The vehicle suspension system of claim 1, wherein:
    the first articulated arm is directly coupled to a first mount point of the frame of the vehicle; and
    the second articulated arm is directly coupled to a second mount point of the frame of the vehicle.

9. A vehicle, comprising:
    a plurality of wheels, each wheel mechanically linked to a respective articulated arm;
    a beam cross tie that mechanically links the articulated arm of a first wheel of the plurality of wheels with the articulated arm of a second wheel of the plurality of wheels; and
    a shock damping assembly mechanically linked to the cross tie and articulated arms of the first and second wheels,
    wherein the articulated arm of the first wheel is pivotably coupled to a first mount point of a frame of a vehicle,
    wherein the articulated arm of the second wheel is pivotably coupled to a second mount point of the frame of the vehicle, wherein a movement of the articulated arm of either the first or second wheel is at least partially transmitted to the shock damping assembly and at least partially transmitted to the other articulated arm, wherein the plurality of wheels comprises a first wheel, a second wheel, a third wheel, and a fourth wheel, wherein the first and second wheels are positioned diagonally from each other on the vehicle, with the first wheel positioned proximate to a front of the vehicle, and the second wheel positioned proximate to a rear of the vehicle, wherein:

the third wheel is positioned proximate to the front of the vehicle;

the fourth wheel is positioned proximate to the rear of the vehicle;

each of the third and fourth wheels is mechanically linked to a respective articulated arm;

the shock damping assembly is a first damping assembly;

the vehicle further comprises:
a second beam cross tie that mechanically links the articulated arm of the third wheel with the articulated arm of the fourth wheel; and
a second shock damping assembly mechanically linked to the second cross tie and articulated arms of the third and fourth wheels;

a first end of the first wheel shock damping assembly is coupled to the articulated arm of the first wheel;

a second end, distal from the first end, of the first wheel shock damping assembly is coupled to the articulated arm of the second wheel;

the articulated arm of the third wheel is coupled to a third mount point of the frame of the vehicle;

the articulated arm of the fourth wheel is coupled to a fourth mount point of the frame of the vehicle;

a first end of the second wheel shock damping assembly is coupled to the articulated arm of the third wheel; and a second end, distal from the first end, of the second wheel shock damping assembly is coupled to the articulated arm of the fourth wheel.

10. A vehicle suspension system, comprising:
a first articulated arm pivotably coupled to a frame of a vehicle;
a second articulated arm pivotably coupled to the vehicle frame;
a cross tie with a first end mechanically linked to the first articulated arm and a second end, distal from the first end, mechanically linked to the second articulated arm; and
a shock absorber mechanically linked to the first articulated arm, the second articulated arm, and the cross tie;
wherein the cross tie is mechanically linked to the first and second articulated arms such that a movement of either the first or second articulated arm is at least partially transmitted to the shock absorber and at least partially transmitted to the other articulated arm, wherein:
the first articulated arm is directly coupled to a first mount point of the frame of the vehicle;
the second articulated arm is directly coupled to a second mount point of the frame of the vehicle;
the first end of the cross tie is directly coupled to a first end of a linking arm;
the linking arm is directly coupled to a third mount point of the frame of the vehicle;
the shock absorber is directly coupled to a second end, distal from the first end, of the linking arm; and
the shock absorber is directly coupled to the first articulated arm.

11. The vehicle suspension system of claim 10, wherein:
the linking arm is a first linking arm:
the shock absorber is a first shock absorber;
the first shock absorber mechanically links the first articulated arm to the first end of the cross tie;
the system further comprises a second shock absorber that mechanically links the second articulated arm to the second end of the cross tie;
the second end of the cross tie is directly coupled to a first end of a second linking arm;
the second linking arm is directly coupled to a fourth mount point of the frame of the vehicle;
the second shock absorber is directly coupled to a second end, distal from the first end, of the second linking arm; and
the second shock absorber is directly coupled to the second articulated arm.

12. The vehicle suspension system of claim 11, further comprising a third shock absorber coupled to the cross tie, wherein:
a first end of the third shock absorber is directly coupled to the cross tie; and
a second end, distal from the first end, of the third shock absorber is directly coupled to a fifth mount point of the frame of the vehicle.

13. The vehicle suspension system of claim 12, wherein the cross tie is a first beam cross tie, the system further comprising:
a first wheel mechanically linked to the first articulated arm;
a second wheel mechanically linked to the second articulated arm;
a third articulated arm pivotably and directly coupled to a sixth mount point of the frame of the vehicle;
a fourth articulated arm pivotably and directly coupled to a seventh mount point of the frame of the vehicle;
a third wheel mechanically linked to the third articulated arm;
a fourth wheel mechanically linked to the fourth articulated arm;
a second beam cross tie with a first end mechanically linked to the third articulated arm, wherein the second cross tie includes a second end, distal from the first end, that is mechanically linked to the fourth articulated arm; and
a fourth shock absorber mechanically linked to the third articulated arm, the fourth articulated arm, and the second cross tie.

14. The vehicle suspension system of claim 13, wherein:
the first end of the second cross tie is directly coupled to a first end of a third linking arm;
the third linking arm is directly coupled to an eighth mount point of the frame of the vehicle;
the fourth shock absorber is directly coupled to a second end, distal from the first end, of the third linking arm; and
the fourth shock absorber is directly coupled to the third articulated arm.

15. The vehicle suspension system of claim 14, wherein:
the fourth shock absorber mechanically links the third articulated arm to the first end of the second cross tie;
the system further comprises a fifth shock absorber that mechanically links the fourth articulated arm to the second end of the second cross tie;

the second end of the second cross tie is directly coupled to a first end of a fourth linking arm;
the fourth linking arm is directly coupled to a ninth mount point of the frame of the vehicle;
the fifth shock absorber is directly coupled to a second end, distal from the first end, of the fourth linking arm;
the fifth shock absorber is directly coupled to the fourth articulated arm;
the system further comprises a sixth shock absorber coupled to the second cross tie;
a first end of the sixth shock absorber is directly coupled to the second cross tie; and
a second end, distal from the first end, of the sixth shock absorber is directly coupled to a tenth mount point of the frame of the vehicle.

\* \* \* \* \*